(12) United States Patent
Hwang et al.

(10) Patent No.: US 9,542,922 B2
(45) Date of Patent: Jan. 10, 2017

(54) METHOD FOR INSERTING WATERMARK TO IMAGE AND ELECTRONIC DEVICE THEREOF

(71) Applicant: Samsung Electronics Co., Ltd., Gyeonggi-do (KR)

(72) Inventors: Ho-Chul Hwang, Seoul (KR); Moon-Soo Kim, Seoul (KR); Ki-Huk Lee, Gyeonggi-do (KR); Jung-Eun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 163 days.

(21) Appl. No.: 14/531,205

(22) Filed: Nov. 3, 2014

(65) Prior Publication Data

US 2015/0127355 A1    May 7, 2015

(30) Foreign Application Priority Data

Nov. 1, 2013 (KR) .......................... 10-2013-0132511

(51) Int. Cl.
| | | |
|---|---|---|
| *G10L 21/00* | (2013.01) | |
| *G10H 7/00* | (2006.01) | |
| *G06T 1/00* | (2006.01) | |
| *G10H 1/00* | (2006.01) | |

(52) U.S. Cl.
CPC ............ *G10H 7/00* (2013.01); *G06T 1/0021* (2013.01); *G10H 1/0041* (2013.01); *G10H 2210/056* (2013.01); *G10H 2210/076* (2013.01); *G10H 2210/081* (2013.01); *G10H 2240/041* (2013.01)

(58) Field of Classification Search
CPC .................................................. G06F 17/30056
USPC .................................................. 704/278, 270
See application file for complete search history.

(56) References Cited

U.S. PATENT DOCUMENTS

| | | | | | |
|---|---|---|---|---|---|
| 5,555,098 | A | * | 9/1996 | Parulski ............... | G11B 27/034 358/906 |
| 6,778,760 | B1 | * | 8/2004 | Kagle ................ | H04N 1/32122 386/201 |
| 7,325,199 | B1 | * | 1/2008 | Reid ................ | G06F 17/30056 707/E17.009 |
| 2001/0029580 | A1 | * | 10/2001 | Moskowitz ............. | G06F 21/10 713/176 |
| 2003/0027489 | A1 | * | 2/2003 | Kay ........................ | G03B 31/06 446/397 |
| 2010/0040349 | A1 | * | 2/2010 | Landy .................. | G11B 27/005 386/353 |
| 2014/0071137 | A1 | * | 3/2014 | Kannan ................ | G11B 27/034 345/473 |

FOREIGN PATENT DOCUMENTS

KR    1020090119018    11/2009

\* cited by examiner

*Primary Examiner* — Jakieda Jackson
(74) *Attorney, Agent, or Firm* — The Farrell Law Firm, P.C.

(57) ABSTRACT

A method for operating an electronic device is provided. The method includes determining one or more images; determining at least one first sound sources; dividing the first sound source into a plurality of second sound sources; and inserting at least one of the plurality of the second sound sources into the one or more images.

17 Claims, 16 Drawing Sheets

METHOD FOR INSERTING WATERMARK TO IMAGE AND ELECTRONIC DEVICE THEREOF

PRIORITY

The present application claims priority under 35 U.S.C. §119 to a Korean Patent Application filed in the Korean Intellectual Property Office on Nov. 1, 2013 and assigned Serial No. 10-2013-0132511, the contents of which are incorporated herein by reference.

BACKGROUND

1. Field of the Disclosure

The present disclosure relates to a method for inserting a watermark into an image and an electronic device thereof.

2. Description of the Related Art

With the development of information communication technology and semiconductor technology, various electronic devices are capable of providing multimedia services, such as a voice call service, a video call service, a messenger service, a broadcast service, a wireless Internet service, a camera service, and a music playback service. In the electronic devices, multimedia information is frequently stored and transmitted in a digital form.

When digital information is duplicated, it is difficult to distinguish original digital information from duplicated digital information. Therefore, security of digital information managed and transmitted by an electronic device is weak.

SUMMARY

The present disclosure has been made to solve at least the above-mentioned problems and/or disadvantages and to provide at least the advantages described below. Accordingly, an aspect of the present disclosure is to provide an apparatus and method for inserting a watermark into an image in an electronic device.

Another aspect of the present disclosure is to provide an apparatus and method for inserting a sound watermark into an image in an electronic device.

Another aspect of the present disclosure is to provide an apparatus and method for performing division and inserting a sound watermark into an image in an electronic device.

Another aspect of the present disclosure is to provide an apparatus and method for inserting a sound watermark into an image by using a music chord in an electronic device.

According to an aspect of the present disclosure, a method for operating an electronic device is provided, which includes determining one or more images; determining at least one first sound sources; dividing the first sound source into a plurality of second sound sources; and inserting at least one of the plurality of the second sound sources into the one or more images.

According to another aspect of the present disclosure, an electronic device is provided, which includes a display unit; an audio output unit; and a processor configured to determine at least one first sound source, to divide the first sound source into a plurality of second sound sources, and to insert at least one of the plurality of the second sources into one or more images.

BRIEF DESCRIPTION OF THE DRAWINGS

The above and other aspects, features and advantages of the present disclosure will become more apparent from the following detailed description when taken in conjunction with the accompanying drawings, in which.

DETAILED DESCRIPTION OF EMBODIMENTS OF THE PRESENT DISCLOSURE

Figure 1:
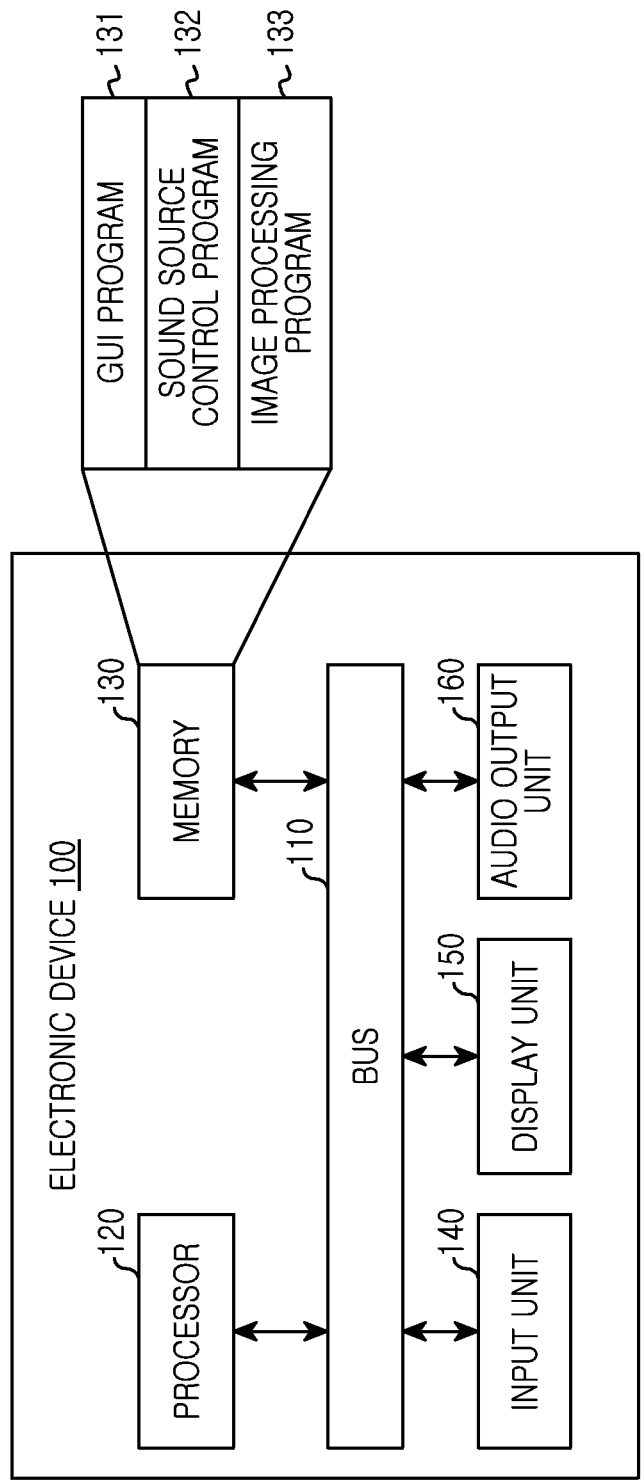
FIG. 1 illustrates a block diagram of a configuration of an electronic device according to an embodiment of the present disclosure.

The following description with reference to the accompanying drawings is provided to assist in a comprehensive understanding of embodiments of the present disclosure as defined by the claims and their equivalents. It includes various specific details to assist in that understanding but these are to be regarded merely as examples. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to their meanings in a dictionary, but, are merely used to enable a clear and consistent understanding of the present disclosure. Accordingly, it should be apparent to those skilled in the art that the following description of embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not to be achieved exactly, but that deviations or variations, including for example, tolerances, measurement error, measurement accuracy limitations and other factors known to those of skill in the art, may occur in amounts that do not preclude the effect that the characteristic was intended to provide.

The present disclosure provides a technique for inserting a sound watermark into an image in an electronic device. A sound watermark may include a sound source to be inserted into an image as a watermark.

The electronic device according to embodiments of the present disclosure may be one or more of a smart phone, a tablet personal computer (PC), a mobile phone, a video phone, an electronic-book reader, a desktop PC, a laptop PC, a netbook computer, a personal digital assistant (PDA), a portable multimedia player (PMP), an MP3 player, an accessory, an appcessory, a camera, a wearable device, a wrist watch, a refrigerator, an air-conditioner, a cleaner, an intelligent robot, a television, a digital video disk (DVD) player, a stereo, an oven, a microwave oven, a washing machine, an electronic bangle, an electronic necklace, an air cleaner, and a digital photo frame, a medical equipment, a navigation device, a satellite signal receiver, an event data recorder (EDR), a flight data recorder (FDR), a set-top box, a TV box, an electronic dictionary, a vehicle infotainment device, a electronic equipment for ship, an avionics device, a security equipment, an electronic clothing, an electronic key, a camcorder, a game console, a head-mounted display (HMD), a flat panel display device, an electronic album, a furniture or a portion of a building/structure including an electronic device, an electronic board, an electronic signature receiving device, and a protector. It is obvious to those skilled in the art that the electronic device according to the present disclosure is not limited to the above-described devices.

FIG. 1 illustrates a block diagram of a configuration of an electronic device according to an embodiment of the present disclosure.

Referring to FIG. 1, the electronic device includes a bus 110, a processor 120, a memory 130, an input unit 140, a display unit 150, and an audio output unit 160. A plurality of processors 120 or a plurality of memories 130 may be provided.

The bus 110 may connect elements included in the electronic device 100 to one another, and control communication between the elements included in the electronic device 100.

The processor 120 may perform control such that the electronic device 100 provides various services. For example, the processor 120 may decode an instruction received from one or more different elements (for example, the memory 130, the input unit 140, the display unit 150, or the audio output unit 160) and perform a data operation or data processing according to the decoded instruction.

The processor 120 may execute one or more programs stored in the memory 130 to enable the electronic device 100 to provide various services. The processor 120 may execute a sound source control program 132 and an image processing program 133 which are stored in the memory 130 to insert at least a part of a sound source to an image as a watermark. For example, the processor 120 may divide a sound source to be used as a watermark into one or more partial source sources including different playback sections based on the number of images included in an image reproduction list. The processor 120 may insert the one or more different partial sound sources into the respective images included in the image reproduction list, as watermarks. The processor 120 may divide a part of the sound source to be used as a watermark into partial sound sources to be inserted into respective images included in the image reproduction list. The image reproduction list may represent an image group according to an image storage method of the electronic device 100.

As another example, the processor 120 may encode a sound source to be used as a watermark such that the sound source is downsized and divide the sound source into one or more partial source sources including different playback sections based on the number of images included in the image reproduction list. The processor 120 may insert the one or more different partial sound sources into the respective images included in the image reproduction list, as watermarks.

As another example, the processor 120 may determine one or more music chords to be used as watermarks and sound sources for the respective music chords. The processor 120 may insert sound sources having different chords into the respective images included in the image reproduction list, as watermarks.

As another example, the processor 120 may determine an effect sound to be used as a watermark. The processor 120 may insert one or more effect sounds into the respective images included in the image reproduction list, as watermarks.

When images included in the image reproduction list are reproduced, the processor 120 may perform control to play back sound sources inserted into the respective images. For example, when images are reproduced, the processor 120 may display an i-th image on the display unit 150 in the arrangement order of the image reproduction list, and output an i-th partial sound source inserted into the i-th image through the audio output unit 160. The processor 120 may display an (i+1)-th image on the display unit 150 at a time point at which the playback of the i-th partial sound source is terminated, and output a (i+1)-th partial sound source inserted into the (i+1)-th image through the audio output unit 160, which is consecutive to the i-th partial sound source. Here, i denotes an index of an image included in the image reproduction list and may include numeral 1 as an initial value.

As another example, when images are reproduced, the processor 120 may display the i-th image on the display unit 150 in the arrangement order of the image reproduction list, and output a sound source having a chord inserted into the i-th image through the audio output unit 160. When an image switching event occurs, the processor 120 may display the (i+1)-th image on the display unit 150, and output a sound source having a chord inserted into the (i+1)-th image through the audio output unit 160.

As another example, when images are reproduced, the processor 120 may display the i-th image on the display unit 150 in the arrangement order of the image reproduction list. When an image switching time point is arrived, the processor 120 may display the (i+1)-th image on the display unit 150. When image switching from the i-th image to the (i+1)-th image is performed, the processor 120 may output an effect sound inserted into the i-th or (i+1)-th image through the audio output unit 160.

The memory 130 may store an instruction or data received from or generated by one or more elements (the processor 120, the input unit 140, the display unit 150, and the audio output unit 160) included in the electronic device 100. For example, the memory 130 may store one or more sound sources.

The memory 130 may store one or more programs for services of the electronic device 100. For example, the memory 130 may include one or more of a graphic user interface (GUI) program 131, a sound source control program 132, and an image processing application program 133.

The GUI program 131 may include at lease one software element for providing a graphic user interface on a display unit 150. When the processor 120 performs control to reproduce an image, the GUI program 131 may perform control to display one or more images of images included in an image reproduction list on the display unit 150 under the control of the processor 120.

The sound source control program 132 may include at least one software element for converting a sound source into a form which is insertable to an image as a watermark. For example, the sound source control program 132 may divide a sound source to be used as a watermark into one or more partial source sources including different playback sections based on the number of images included in an image reproduction list. The sound source control program 132 may divide a part of the sound source to be used as a watermark into partial sound sources to be inserted into respective images included in the image reproduction list. As another example, when the size of a sound source to be used as a watermark is larger than a reference size, the sound source control program 132 may encode the sound source to be used as a watermark such that the sound source is downsized, and divide the sound source into one or more partial sound sources based on the number of images included in the image reproduction list. As another example, the sound source control program 132 may determine one or more of an instrument and a sound source of at least one music chord to be used as a watermark.

The image processing program 133 may include at least one software element for inserting a sound source converted by the sound source control program 132 into an image as a watermark.

The input unit 140 may transmit an instruction or data generated by a user's selection to the processor 120 or the memory 130 through the bus 110. For example, the input unit 140 may include at least one of a keypad including at least one hardware button and a touch panel for detecting touch information.

The display unit 150 may display an image, a video, or data to the user. For example, the display unit 150 may display information about application programs executed by the processor 120.

The audio output unit 160 may output an audio signal to the user. For example, the audio output unit 160 may play back and output a sound source which is inserted into an image displayed on the display unit 150 as a watermark.

Although not illustrated, the electronic device 100 may further include a communication module for communicating with one or more other electronic devices, a server, or one or more peripherals. For example, the communication module supports one or more of a short-range communication protocol (for example, wireless fidelity (Wifi), bluetooth (BT), near field communication (NFC)), network communication (for example, Internet, local area network (LAN), wire area network (WAN)), telecommunication network, cellular network, satellite network, and plain old telephone service (POTS).

In the above-described embodiment of the present disclosure, the processor 120 may execute software elements stored in the memory 130 through one module to insert at least a part of a sound source into an image as a watermark.

Figure 2:
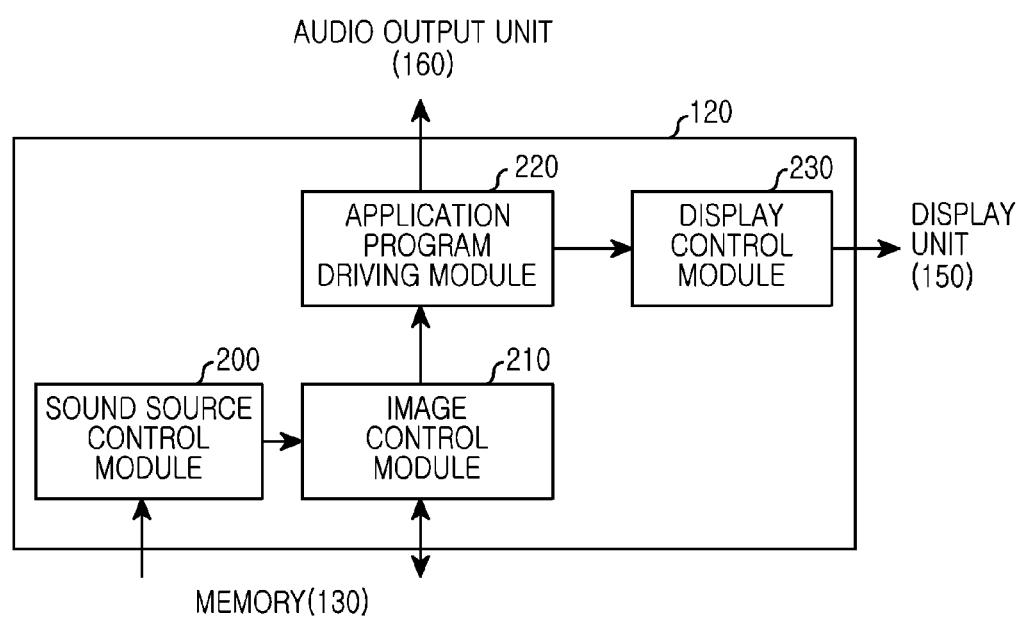
FIG. 2 illustrates a block diagram of a detailed configuration of a processor according to an embodiment of the present disclosure.

In another embodiment of the present disclosure, the processor 120 may be configured to include separate modules, which function as an element for inserting at least a part of a sound source into an image as a watermark as illustrated in FIG. 2.

FIG. 2 illustrates a block diagram of a detailed configuration of a processor according to an embodiment of the present disclosure.

Referring to FIG. 2, the processor 120 may include a sound source control module 200, an image control module 210, an application program driving module 220, and a display control module 230.

The sound source control module 200 may convert a sound source into a form which is insertable into an image as a watermark. The sound source control module 200 may execute the sound source control program 132 stored in the memory 130 to convert a sound source into a form which is insertable into an image as a watermark. For example, the sound source control module 200 may divide a sound source to be used as a watermark into one or more partial source sources including different playback sections based on the number of images included in an image reproduction list. The sound source control module 200 may divide a part of the sound source to be used as a watermark into partial sound sources to be inserted into respective images included in the image reproduction list. As another example, when the size of a sound source to be used as a watermark is larger than a reference size, the sound source control module 200 may encode the sound source to be used as a watermark such that the sound source is downsized, and divide the sound source into one or more partial sound sources based on the number of images included in the image reproduction list. As yet another example, the sound source control module 200 may determine one or more of an instrument and a sound source of at least one music chord to be used as a watermark.

The image control module 210 may insert a sound source provided from the sound source control module 220 into an image as a watermark. The image control module 210 may execute the image processing program 133 stored in the memory 130 to insert the sound source converted by the sound source control module 200 into the image as the watermark. For example, the image control module 210 may insert the one or more different partial sound sources into the respective images included in the image reproduction list, as watermarks. As another example, the image control module 210 may insert sound sources having different chords into the respective images included in the image reproduction list, as watermarks. As another example, the image control module 210 may insert one or more effect sounds into the respective images included in the image reproduction list, as watermarks.

The application program driving module 220 may execute at least one application program stored in the memory 120 to provide a service corresponding to the application program. The application program driving module 220 may reproduce images included in the image reproduction list according to an image reproduction event. The application program driving module 220 may play back a sound source inserted into each of the images. For example, when an image reproduction event occurs, the application program driving module 220 may perform control to display an i-th image on the display unit 150 based on an arrangement order of the image reproduction list by using the display control module 230, and output an i-th partial sound source inserted into the i-th image through the audio output unit 160. The application program driving module 220 may perform control to display an (i+1)-th image on the display unit 150 by using the display control module 230 at a time point at which the playback of the i-th partial sound source is terminated, and output an (i+1)-th partial sound source inserted into the (i+1)-th image through the audio output unit 160, which is consecutive to the i-th partial sound source.

As another example, when an image reproduction event occurs, the application program driving module 220 may perform control to display an i-th image on the display unit 150 based on the arrangement order of the image reproduction list by using the display control module 230, and repeatedly output a sound source having a music chord inserted into the i-th image through the audio output unit 160. When an image switching event occurs, the application program driving module 220 may perform control to display the (i+1)-th image on the display unit 150 by using the display control module 230, and repeatedly output a sound source having a chord inserted into the (i+1)-th image through the audio output unit 160.

As yet another example, when an image reproduction event occurs, the application program driving module 220 may perform control to display the i-th image on the display unit 150 based on the arrangement order of the image reproduction list by using the display control module 230. When an image switching time point is arrived, the application program driving module 220 may perform control to display the (i+1)-th image on the display unit 150 by using the display control module 230. When image switching from the i-th image to the (i+1)-th image is performed, the application program driving module 220 may output an effect sound inserted into the i-th or (i+1)-th image through the audio output unit 160.

The display control module 230 displays a graphic user interface on the display unit 150. The display control module 230 may execute the GUI program 131 stored in the memory 130 to display the graphic user interface on the display unit 150. For example, the display control module 230 may perform control to display an image on the display unit 150 in response to a request of the application program driving module 230.

In the above-described embodiment of the present disclosure, the electronic device may insert at least a part of a sound source into an image as a watermark by using the processor 120.

In another embodiment of the present disclosure, the electronic device may include a separate control module for inserting at least a part of a sound source into an image as a watermark.

Figure 3:
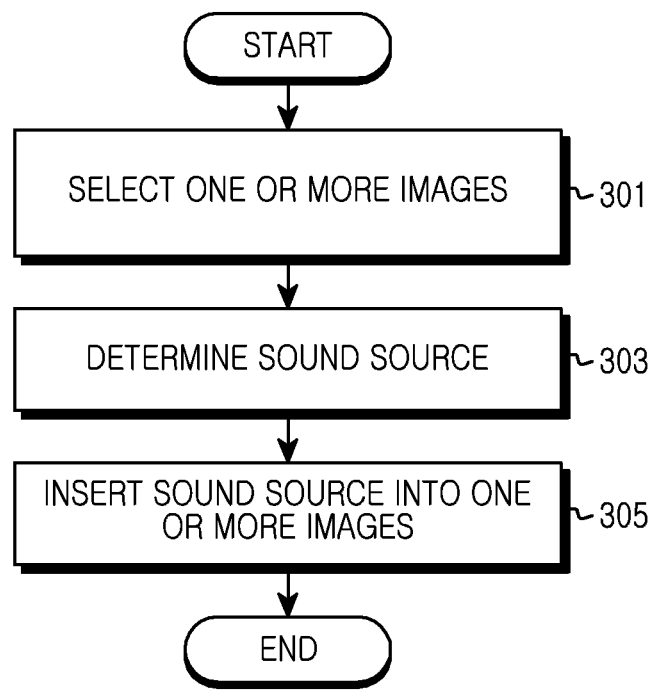
FIG. 3 illustrates a process for inserting a sound watermark into an image in an electronic device according to an embodiment of the present disclosure.

FIG. 3 illustrates a process for inserting a sound watermark into an image in an electronic device according to an embodiment of the present disclosure.

Referring to FIG. 3, in step 301, the electronic device may select or determine one or more images for image reproduction. For example, the electronic device may select one or more images for image reproduction among images included in an image folder based on input information provided through the input unit 140.

In step 303, the electronic device may determine a sound source to be inserted as a watermark of an image. For example, the electronic device may select a sound source to be used as a watermark among one or more sound sources stored in the memory 130 based on input information provided through the input unit 140.

When one or more sound sources to be inserted as watermarks of images are determined, the electronic device may insert the one or more sound sources into images selected for image reproduction as watermarks in step 305. For example, the electronic device may divide a sound source to be used as watermark into one or more partial sound sources based on the number of images selected for image reproduction. The electronic device may insert the one or more partial sound sources into the respective images selected for image reproduction as watermarks. The electronic device may encode the sound source to be used as a watermark such that the sound source is downsized, and then divide the sound source into one or more partial sound sources or divide a part of the sound source to be used as a watermark into one or more partial sound sources. As another example, the electronic device may insert a music chord selected to be used as a watermark and a sound source for the music chord into an image for image reproduction as a watermark. As another example, the electronic device may insert one or more effect sounds selected to be used as watermarks into respective images selected for image reproduction as watermarks.

Figure 4:
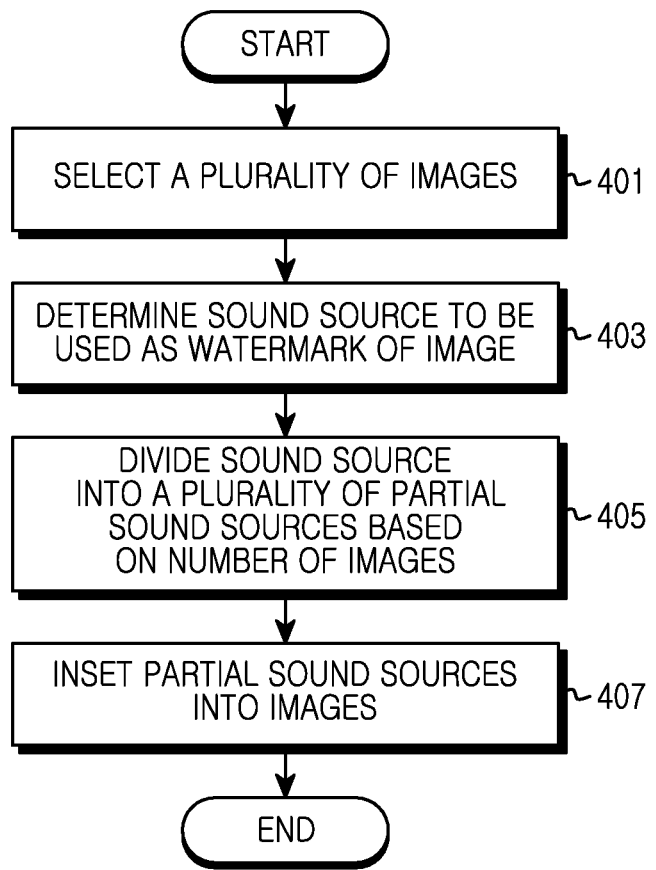
FIG. 4 illustrates a process for inserting a sound watermark into an image in an electronic device according to an embodiment of the present disclosure.

FIG. 4 illustrates a process for performing division and inserting a sound watermark into an image in an electronic device according to an embodiment of the present disclosure. An example of the process for performing division and inserting a sound watermark into an image will be described in reference with FIG. 5.

Figure 5:
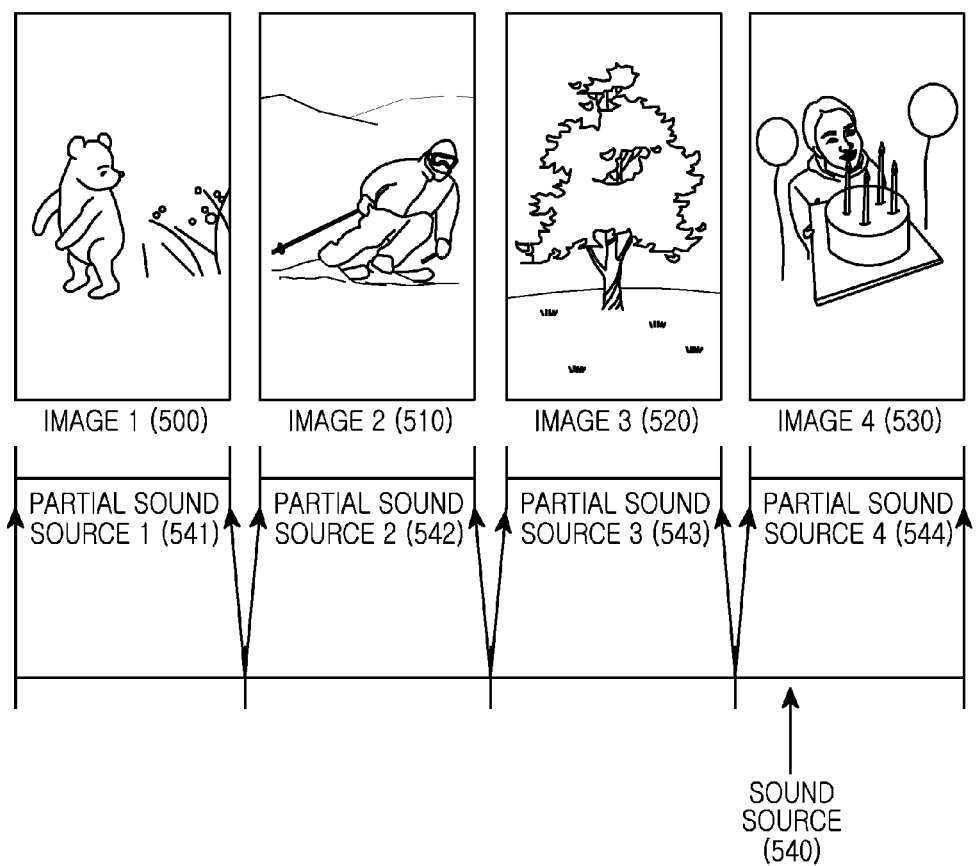
FIG. 5 illustrates an example for inserting a sound watermark into an image in an electronic device according to an embodiment of the present disclosure.

Referring to FIG. 4, the electronic device may select or determine a plurality of images for image reproduction in step 401. Referring to FIG. 5, the electronic device may select an image 1 500, an image 2 510, an image 3 520, and an image 4 530 as images to be reproduced among images included in an image folder based on input information provided through the input unit 140. As another example, the electronic device may acquire a plurality of images for image reproduction using a camera unit.

In step 403, the electronic device may determine a sound source to be used as a watermark of an image. For example, referring to FIG. 5, the electronic device may select a sound source 540 to be used as a watermark among one or more sound sources stored in the memory 130 based on input information provided through the input unit 140.

When the sound source to be used as a watermark of an image is determined, the electronic device may convert the sound source to be used as a watermark of an image into a form which is insertable as a watermark, based on the number of images selected for image reproduction in step 405. For example, referring to FIG. 5, the electronic device may divide the sound source 540 to be used as a watermark into four partial sound sources 541, 542, 543 and 544 including different playback sections, based on the number (for example, 4) of images selected for image reproduction.

When a sound source is converted into a form which is insertable as a watermark, the electronic device may insert the one or more partial sound sources into images selected for image reproduction as watermarks in step 407. The electronic device may insert different partial sound sources into the images as watermarks. Referring to FIG. 5, the electronic device may insert a partial sound source 1 541 into the image 1 500 as a watermark, insert a partial sound source 2 542 into the image 2 510 as a watermark, insert a partial sound source 3 543 into the image 3 520 as a watermark, and insert a partial sound source 4 544 into the image 4 530 as a watermark.

Figure 6:
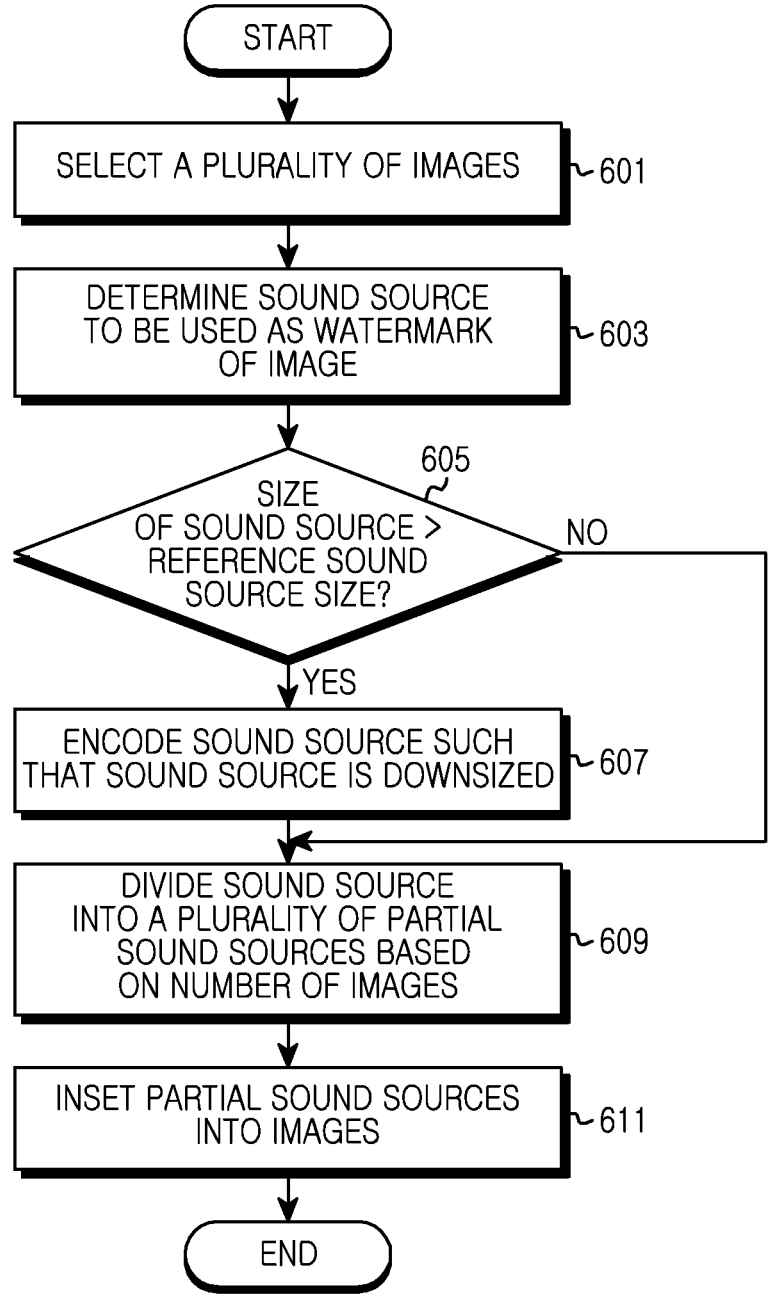
FIG. 6 illustrates a process for performing division and inserting a sound watermark into an image based on the size of a sound source in an electronic device according to an embodiment of the present disclosure.

FIG. 6 illustrates a process for performing division and inserting a sound watermark into an image based on the size of a sound source in an electronic device according to an embodiment of the present disclosure. An example of the process for performing division and inserting a sound watermark into an image will be described in reference with FIG. 5.

Referring to FIG. 6, the electronic device may select or determine a plurality of images for image reproduction in step 601. Referring to FIG. 5, the electronic device may select an image 1 500, an image 2 510, an image 3 520, and an image 4 530 as images to be reproduced among images included in an image folder based on input information provided through the input unit 140. As another example, the electronic device may acquire a plurality of images for image reproduction using a camera unit.

In step 603, the electronic device may determine a sound source to be used as a watermark of an image. For example, referring to FIG. 5, the electronic device may select a sound source 540 to be used as a watermark among one or more sound sources stored in the memory 130 based on input information provided through the input unit 140.

When the sound source to be used as a watermark of an image is determined, the electronic device may determine whether a size of the sound source to be used as a watermark exceeds a reference sound source size in step 605. Here, the reference sound source size may represent the maximum size of a sound source which is insertable to an image as a watermark.

When the size of the sound source to be used as a watermark exceeds the reference sound source size in step 605, the electronic device may encode the sound source to be used as a watermark such that the sound source is downsized in step 607.

When the sound source to be used as a watermark of an image is encoded such that the sound source is downsized, the electronic device may convert the sound source, which is encoded to be downsized, into a form which is insertable as a watermark, based on the number of images selected for image reproduction in step 609. For example, referring to FIG. 5, the electronic device may divide the sound source 540, which is encoded to be downsized, into four partial sound sources 541, 542, 543 and 544 including different playback sections, based on the number (for example, 4) of images selected for image reproduction.

When the size of the sound source to be used as a watermark does not exceed the reference sound source size in step 605, the electronic device may proceed to step 609.

The electronic device may insert the one or more partial sound sources into the respective images selected for image reproduction as watermarks in step 611. The electronic device may insert different partial sound sources into the respective images as watermarks. Referring to FIG. 5, the electronic device may insert a partial sound source 1 541 into the image 1 500 as a watermark, insert a partial sound source 2 542 into the image 2 510 as a watermark, insert a partial sound source 3 543 into the image 3 520 as a watermark, and insert a partial sound source 4 544 into the image 4 530 as a watermark.

In the above-described embodiment of the present disclosure, when the size of a sound source to be used as a watermark is larger than a reference sound source size, the electronic device may encode the sound source such that the sound source is downsized and then divide the sound source into a plurality of partial sound sources.

As another embodiment of the present disclosure, the electronic device may divide the sound source to be used as a watermark into a plurality of partial sound sources based on the number of images selected for image reproduction and compare the size of a partial sound source with a reference partial sound source size. When the size of the partial sound source is larger than the reference partial sound source size, the electronic device may encode the partial sound sources such that the sound source is downsized and insert the partial sound sources into respective images.

Figure 7:
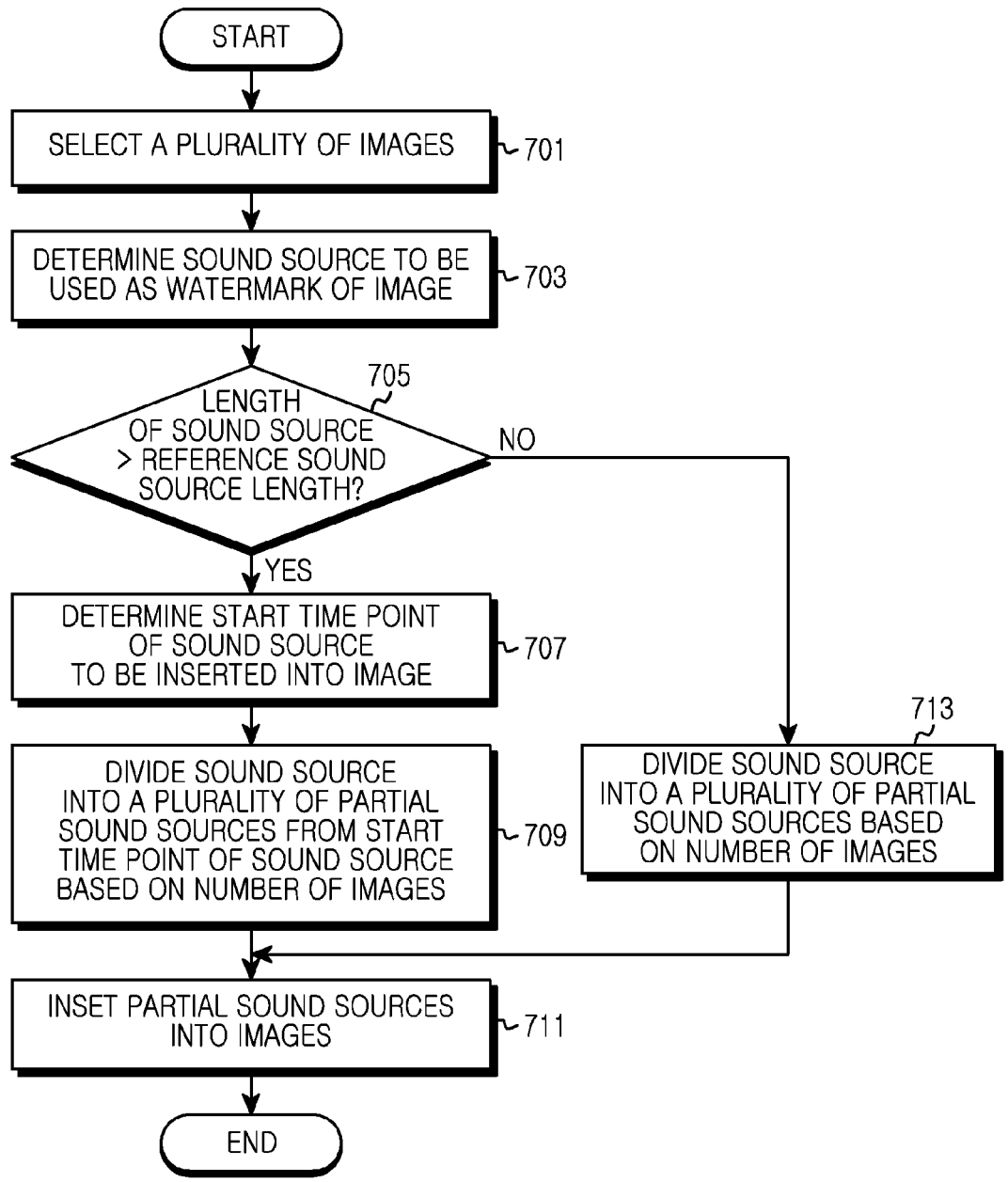
FIG. 7 illustrates a process for performing division and inserting a sound watermark into an image based on the length of a sound source in an electronic device according to an embodiment of the present disclosure.

FIG. 7 illustrates a process for performing division and inserting a sound watermark into an image based on the length of a sound source in an electronic device according to an embodiment of the present disclosure. An example of the process for performing division and inserting a sound watermark into an image will be described in reference with FIG. 8.

Figure 8:
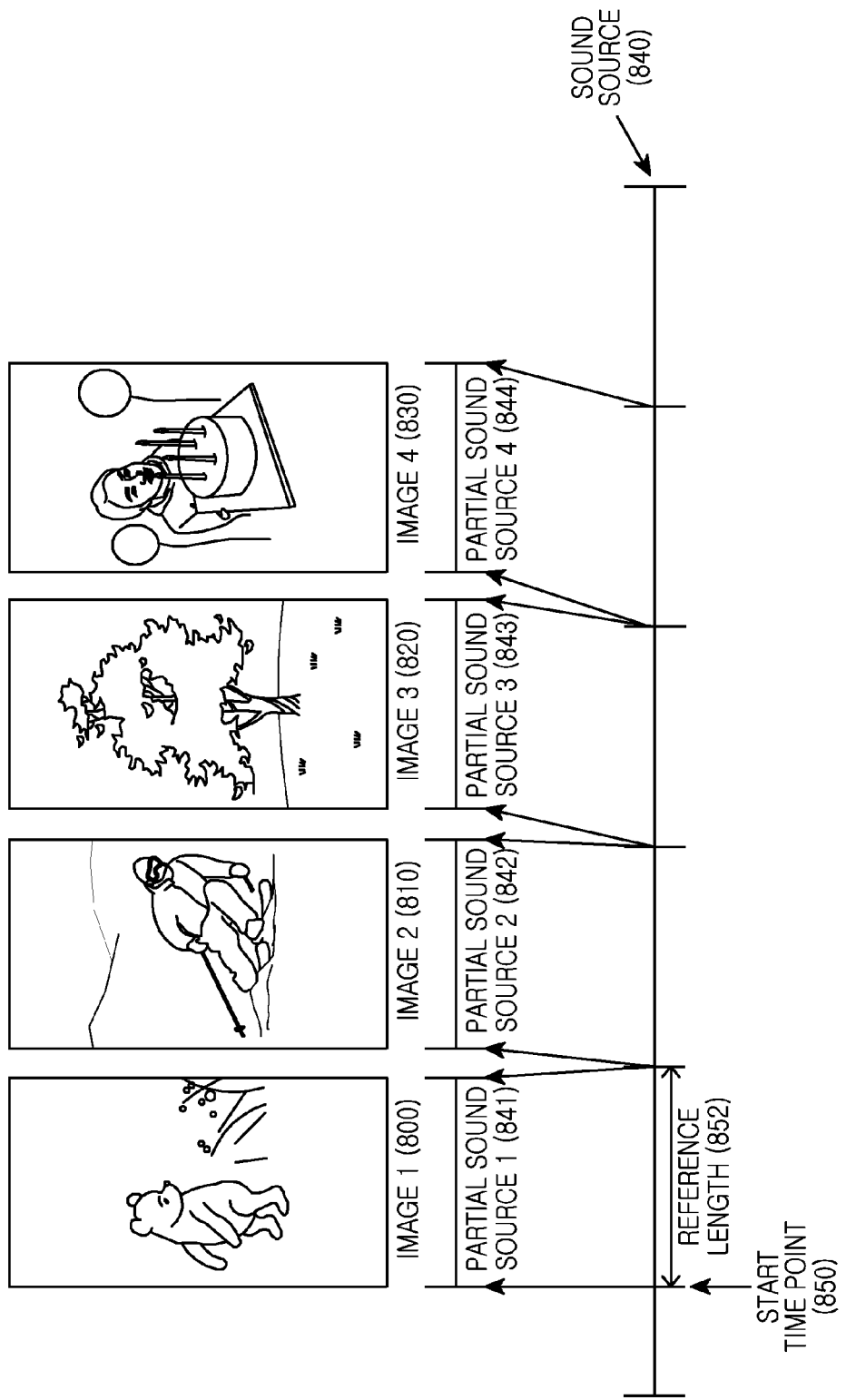
FIG. 8 illustrates an example for performing division and inserting a sound watermark into an image based on the length of a sound source in an electronic device according to an embodiment of the present disclosure.

Referring to FIG. 7, the electronic device may select or determine a plurality of images for image reproduction in step 701. Referring to FIG. 8, the electronic device may select an image 1 800, an image 2 810, an image 3 820, and an image 4 830 as images to be reproduced among images included in an image folder based on input information provided through the input unit 140. As another example, the electronic device may acquire a plurality of images for image reproduction using a camera unit.

In step 703, the electronic device may determine a sound source to be used as a watermark of an image. For example, referring to FIG. 8, the electronic device may select a sound source 840 to be used as a watermark among one or more sound sources stored in the memory 130 based on input information provided through the input unit 140.

When the sound source to be used as a watermark of an image is determined, the electronic device may determine whether a length of the sound source to be used as a watermark exceeds a reference sound source length in step 705. Here, the length of a sound source may represent a playback time of the sound source, and the reference sound source length is a reference playback time of the sound source that represents the maximum playback time of a sound source which can be used as a watermark.

When the length of the sound source to be used as a watermark exceeds the reference sound source length, the electronic device may recognize that the sound source within the full length selected as a watermark can not be used as a watermark. Therefore, the electronic device may determine a start time point in the sound source to be used as a watermark in step 707. For example, the electronic device may determine the start time point of the sound source as a start time point for a watermark. As another example, referring to FIG. 8, the electronic device may determine a start time point 850 in the sound source 840 to be used as a watermark based on input information provided through the input unit 140.

When the start time point is determined in the sound source to be used as a watermark, the electronic device may convert the sound source as use as a watermark into a form which is insertable as a watermark based on the number of images selected for image reproduction in step 709. For example, referring to FIG. 8, the electronic device may divide the sound source 840 to be used as a watermark into four partial sound sources 841, 842, 843, and 844 including different playback sections from the start time point 850, based on the number (for example, 4) of images selected for image reproduction. The electronic device may divide the sound source to be used as a watermark into a plurality of partial sound sources 841, 842, 843, and 844 such that each of the partial sound sources 841, 842, 843, and 844 has a reference length 852. Here, the reference length may include the maximum playback time of a partial sound source which is insertable to one image.

When the length of the sound source to be used as a watermark does not exceed the reference sound source length in step 705, the electronic device may convert the sound source to be used as a watermark into a form which is insertable as a watermark based on the number of images selected for image reproduction in step 713. For example, the electronic device may divide a sound source to be used as watermark into one or more partial sound sources including different playback sections based on the number of images selected for image reproduction.

When the sound source to be used as a watermark is converted into a form which is insertable as a watermark, the electronic device may insert the one or more partial sound sources into the images selected for image reproduction as watermarks in step 711. The electronic device may insert different partial sound sources into the respective images as watermarks. Referring to FIG. 8, the electronic device may insert a partial sound source 1 841 into the image 1 800 as a watermark, insert a partial sound source 2 842 into the image 2 810 as a watermark, insert a partial sound source 3 843 into the image 3 820 as a watermark, and insert a partial sound source 4 844 into the image 4 830 as a watermark.

Figure 9:
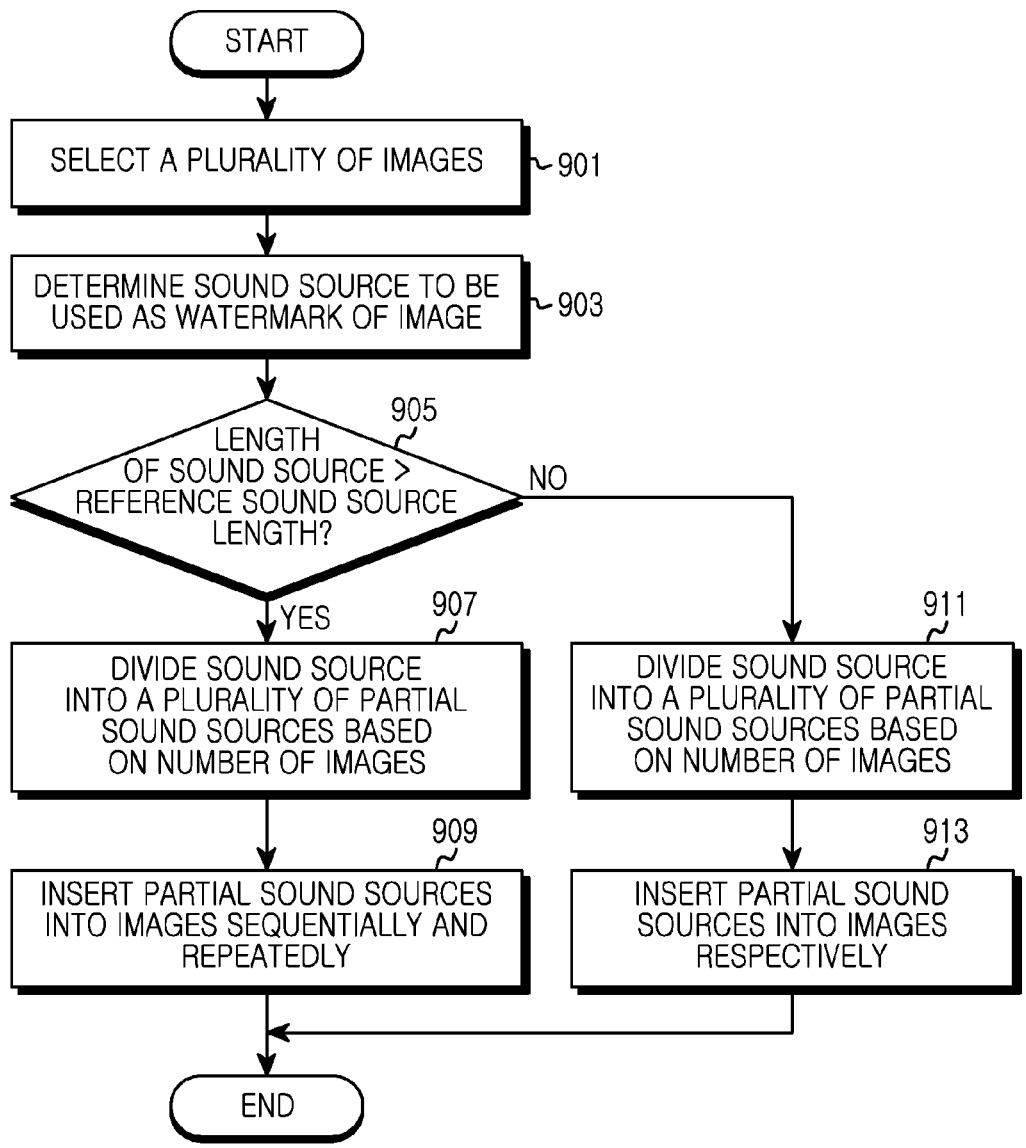
FIG. 9 illustrates a process for performing division and inserting a sound watermark into an image based on the length of a sound source in an electronic device according to another embodiment of the present disclosure.

FIG. 9 illustrates a process for performing division and inserting a sound watermark into an image based on the length of a sound source in an electronic device according to another embodiment of the present disclosure. An example of the process for performing division and inserting a sound watermark into an image will be described in reference with FIG. 10.

Figure 10:
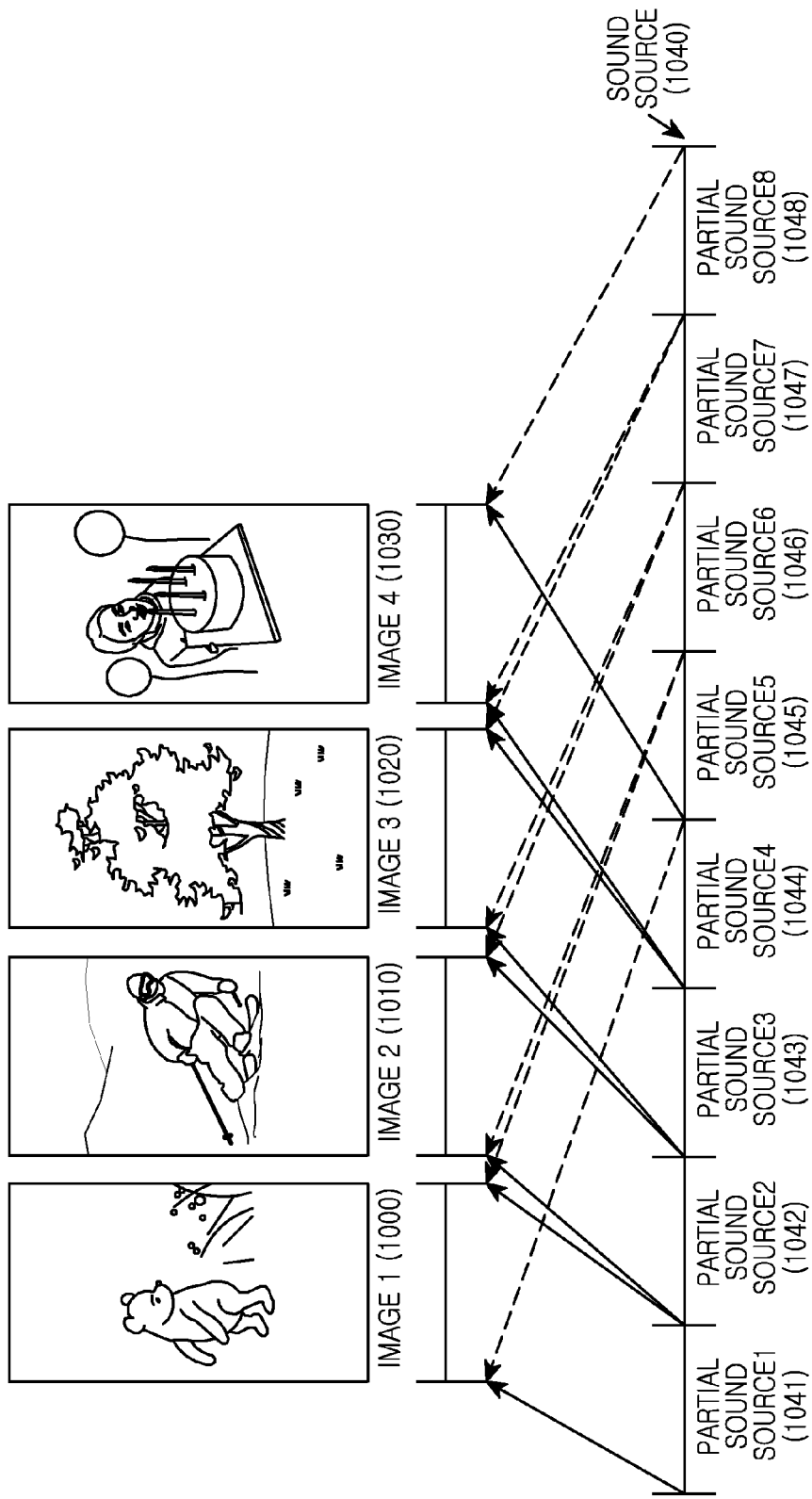
FIG. 10 illustrates an example for performing division and inserting a sound watermark into an image based on the length of a sound source in an electronic device according to another embodiment of the present disclosure.

Referring to FIG. 9, the electronic device may select or determine a plurality of images for image reproduction in step 901. Referring to FIG. 10, the electronic device may select an image 1 1000, an image 2 1010, an image 3 1020, and an image 4 1030 as images to be reproduced among images included in an image folder based on input information provided through the input unit 140. As another example, the electronic device may acquire a plurality of images for image reproduction using a camera unit.

In step 903, the electronic device may determine a sound source to be used as a watermark of an image. For example, referring to FIG. 10, the electronic device may select a sound source 1040 to be used as a watermark among one or more sound sources stored in the memory 130 based on input information provided through the input unit 140.

When the sound source to be used as a watermark of an image is determined, the electronic device may determine whether a length of the sound source to be used as a watermark exceeds a reference sound source length in step 905. Here, the length of a sound source may represent a playback time of the sound source, and the reference sound source length may represent the maximum playback time of a sound source which can be used as a watermark.

When the length of the sound source to be used as a watermark exceeds the reference length, the electronic device may convert the sound source to be used as a watermark into a form which is insertable as a watermark based on the number of images selected for image reproduction in step 907. For example, referring to FIG. 10, the electronic device may divide the sound source 1040 to be used as a watermark into eight partial sound sources 1041 to 1048 including different playback sections, based on the number (for example, 4) of images selected for image reproduction.

When the sound source to be used as a watermark is converted into a form which is insertable as a watermark, the electronic device may insert the one or more partial sound sources into the images selected for image reproduction as watermarks in step 909. Here, the electronic device may insert different partial sound sources into the images as watermarks, sequentially, repeatedly, or selectively. For example, referring to FIG. 10, the electronic device may insert a partial sound source 1 1041 and a partial sound source 5 1045 into the image 1 1000 as a watermark, insert a partial sound source 2 1042 and a partial sound source 6 1046 into the image 2 1010 as a watermark, insert a partial sound source 3 1043 and a partial sound source 7 1047 into the image 3 1020 as a watermark, and insert a partial sound source 4 1044 and a partial sound source 8 1048 into the image 4 1030 as a watermark.

When the length of the sound source to be used as a watermark does not exceed a reference size in step 905, the electronic device may convert the sound source to be used as a watermark into a form which is insertable as a watermark based on the number of images selected for image reproduction in step 911. For example, the electronic device may divide a sound source to be used as watermark into one or more partial sound sources including different playback sections based on the number of images selected for image reproduction.

When the sound source to be used as a watermark is converted into a form which is insertable as a watermark, the electronic device may insert the one or more partial sound sources into the images selected for image reproduction as watermarks in step 913. The electronic device may insert different partial sound sources into the respective images as watermarks.

Figure 11:
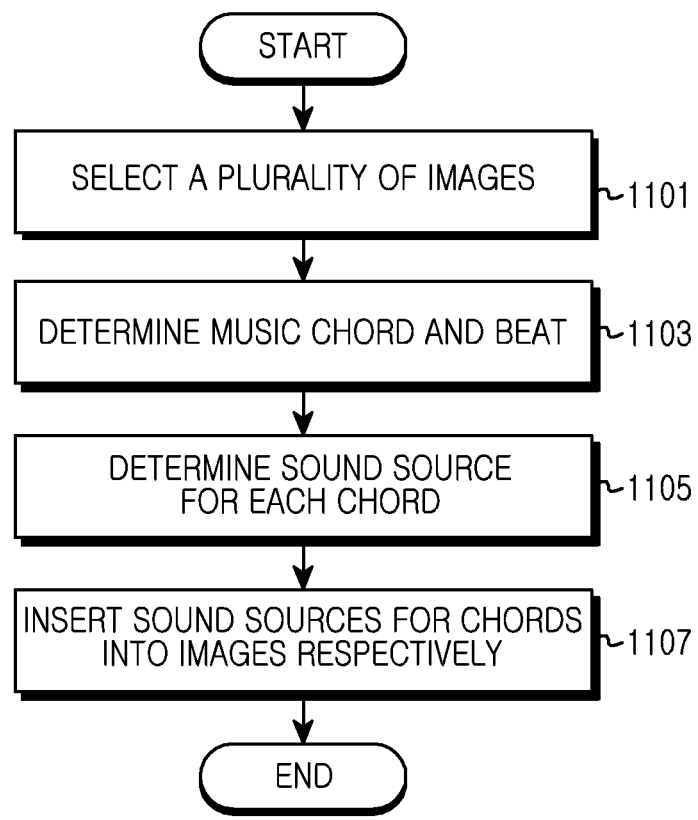
FIG. 11 illustrates a process for inserting a sound watermark using a music chord into an image in an electronic device according to an embodiment of the present disclosure.

FIG. 11 illustrates a process for inserting a sound watermark using a music chord into an image in an electronic device according to an embodiment of the present disclosure. An example of the process for inserting a sound watermark using a music chord into an image will be described in reference with FIG. 12.

Figure 12:
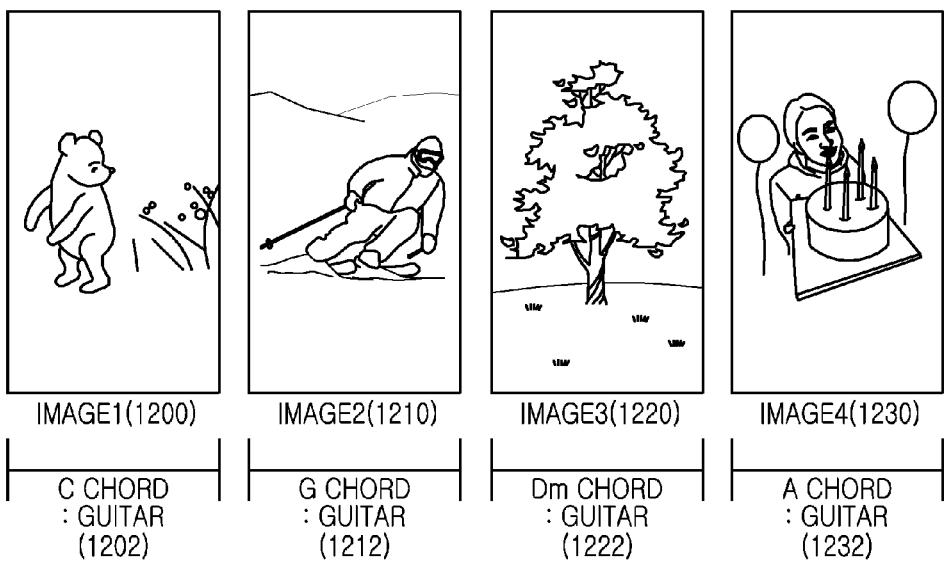
FIG. 12 illustrates an example for inserting a sound watermark using a music chord into an image in an electronic device according to an embodiment of the present disclosure.

Referring to FIG. 11, the electronic device may select or determine a plurality of images for image reproduction in step 1101. Referring to FIG. 12, the electronic device may select an image 1 1200, an image 2 1210, an image 3 1220, and an image 4 1230 as images to be reproduced among images included in an image folder based on input information provided through the input unit 140. As another example, the electronic device may acquire a plurality of images for image reproduction using a camera unit.

In step 1103, the electronic device may determine a music chord to be used as a watermark of an image and a beat of a sound source. Here, the music chord may refer to an ordered sequence of notes such as, C chord, G chord, Dm chord, and A chord.

In step 1105, the electronic device may determine a sound source for each music chord. For example, the electronic device may select a sound source for each music chord based on input information provided through the input unit 140. The sound source for each music chord may include instrument information for a relevant music chord. For example, referring to FIG. 12, the electronic device may select a sound source 1202 for C chord including "Guitar", a sound source 1212 for G chord including "Guitar", a sound source 1222 for Dm chord including "Guitar", and a sound source 1232 for A chord including "Guitar".

When the sound source for each music chord is determined, the electronic device may insert the sound source with information about the music chord into each of images selected for image reproduction as a watermark in step 1107. The electronic device may insert sound sources having different music chords into the respective images. For example, referring to FIG. 12, the electronic device may insert C chord 1202 for guitar performance into the image 1 1200 as a watermark, insert G chord 1212 for guitar performance into the image 2 1210 as a watermark, insert Dm chord 1222 for guitar performance into the image 3 1220 as a watermark, and insert A chord 1232 for guitar performance into the image 4 1230 as a watermark.

Figure 13:
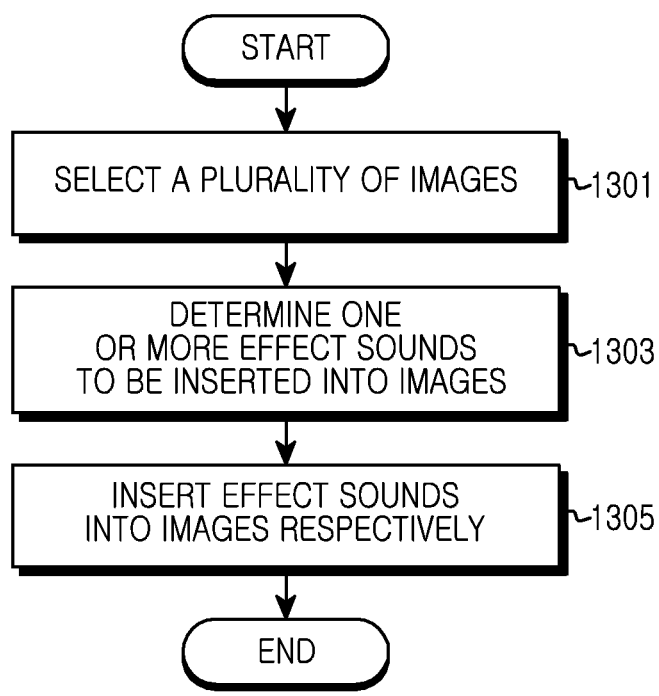
FIG. 13 illustrates a process for inserting a sound watermark using an effect sound into an image in an electronic device according to an embodiment of the present disclosure.

FIG. 13 illustrates a process for inserting a sound watermark using an effect sound into an image in an electronic device according to an embodiment of the present disclosure.

Referring to FIG. 13, the electronic device may select or determine a plurality of images for image reproduction in step 1301. For example, the electronic device may select a plurality of images for image reproduction among images included in an image folder based on input information provided through the input unit 140. As another example, the electronic device may acquire a plurality of images for image reproduction using a camera unit.

In step 1303, the electronic device may determine one or more effect sounds to be used as a watermark of an image.

The electronic device may insert the effect sounds into the respective images selected for image reproduction as watermarks in step 1305. For example, the electronic device may insert different image-switching effect sounds into the images selected for image reproduction as watermarks. As another example, the electronic device may insert a same image-switching effect sound into the images selected for image reproduction as a watermark.

Figure 14:
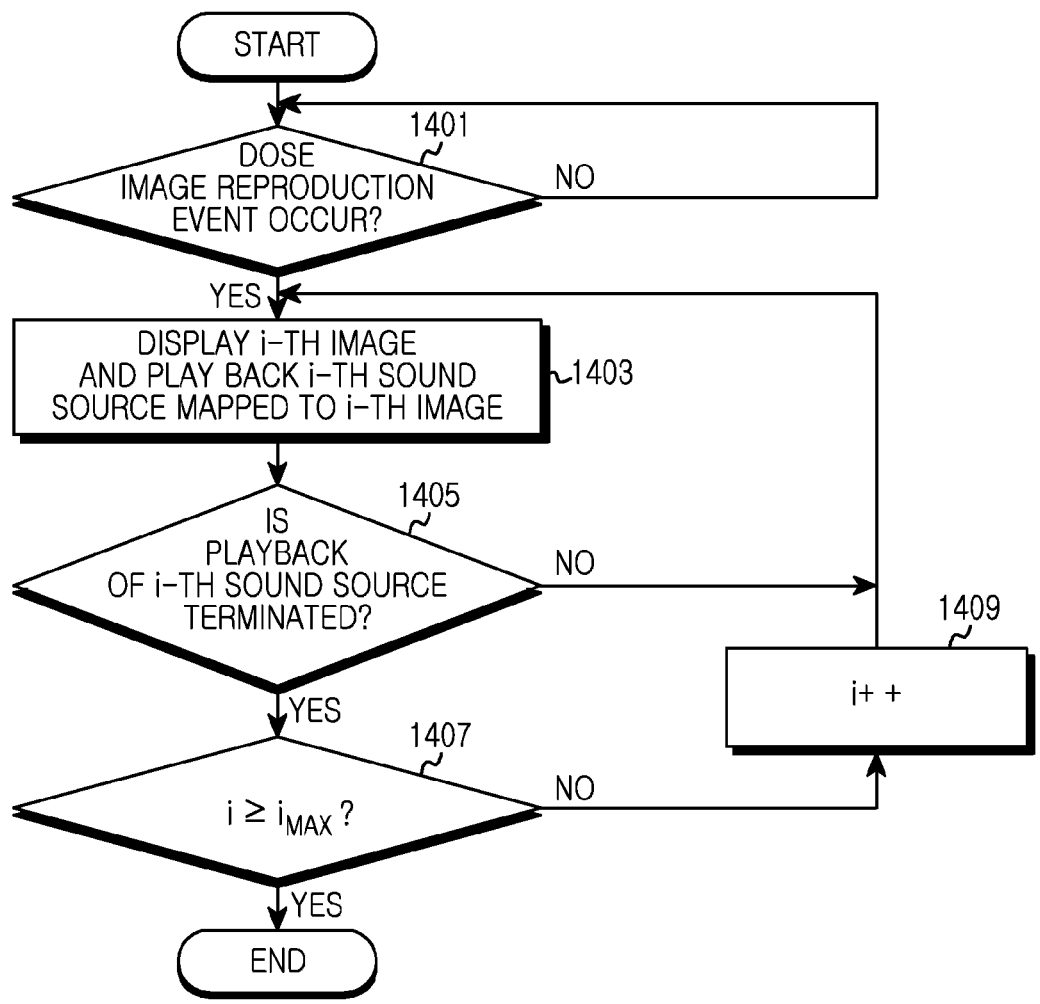
FIG. 14 illustrates a process for playing back a sound source inserted into an image in an electronic device according to an embodiment of the present disclosure.

FIG. 14 illustrates a process for playing back a sound source inserted into an image in an electronic device according to an embodiment of the present disclosure.

Referring to FIG. 14, the electronic device may determine whether an image reproduction event occurs in step 1401. For example, the electronic device may determine whether a menu for displaying a slide show is selected for a photo album based on input information provided through the input unit 140.

When the image reproduction event occurs, the electronic device may display an i-th image according to reproduction orders of images included in an image reproduction list in step 1403. In addition, the electronic device may play back an i-th sound source inserted into the i-th image. For example, the electronic device may play back an i-th partial sound source inserted into the i-th image. As another example, the electronic device may play back an i-th sound source of a music chord inserted into the i-th image. Here, i is an index of an image included in the image reproduction list and may include numeral 1 as an initial value.

In step 1405, the electronic device may determine whether the playback of the i-th sound source is terminated. For example, the electronic device may determine whether a time point, at which the playback of the i-th sound source inserted into the i-th image as a watermark is to be terminated, is arrived.

When the playback of the i-th sound source is not terminated, the electronic device may maintain the display of the i-th image and the playback of the i-th sound source in step 1403.

When the playback of the i-th sound source is terminated in step 1405, the electronic device may compare the index i of an image that is being displayed with the total number $i_{MAX}$ of images included in the image reproduction list in step 1607 so as to identify whether there is an image to be reproduced additionally in step 1407. For example, the electronic device may identify whether the index i of the image that is being displayed is equal to or larger than the total number $i_{MAX}$ of images included in the image reproduction list.

When the index i of the image that is being displayed is equal to or larger than the total number $i_{MAX}$ of images included in the image reproduction list, the electronic device may recognize that all images included in the image reproduction list have been reproduced. Therefore, the electronic device may terminate image reproduction. When the image reproduction is terminated, for example, the electronic device may apply a fade-out effect to the i-th sound source such that the playback of the sound source inserted into the image is naturally terminated. Here, the fade-out effect may refer to an effect of gradually lowering the sound volume of a sound source until the sound disappears.

When the index i of the image that is being displayed is smaller than the total number $i_{MAX}$ of images included in the image reproduction list in step 1407, the electronic device may increase an image index by one (i++) in step 1409.

The electronic device may display the i-th image on the display unit 150 and play back the i-th sound source inserted into the i-th image in step 1403.

In the above-described embodiment of the present disclosure, the electronic device may terminate the image reproduction when all images included in the image reproduction list have been sequentially reproduced.

In another embodiment of the present disclosure, the electronic device may reproduce the images starting over from the first image again when all images included in the image reproduction list have been sequentially reproduced.

Figure 15:
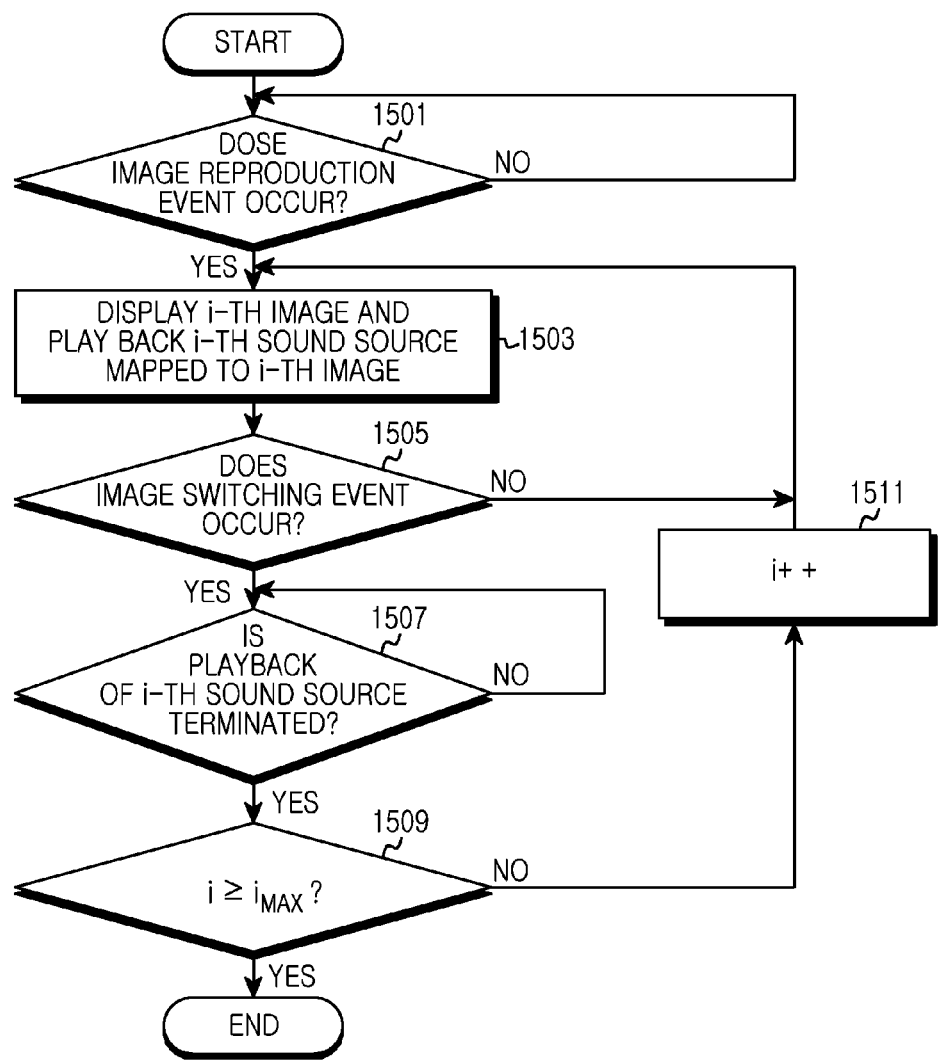
FIG. 15 illustrates a process for playing back a sound source inserted into an image in an electronic device according to another embodiment of the present disclosure.

FIG. 15 illustrates a process for playing back a sound source inserted into an image in an electronic device according to another embodiment of the present disclosure.

Referring to FIG. 15, the electronic device may determine whether an image reproduction event occurs in step 1501. For example, the electronic device may determine whether a menu for displaying a slide show is selected for a photo album based on input information provided through the input unit 140.

When the image reproduction event occurs, the electronic device may display an i-th image according to reproduction orders of images included in an image reproduction list in step 1503. In addition, the electronic device may play back an i-th sound source inserted into the i-th image. For example, the electronic device may play back an i-th sound source of a music chord inserted into the i-th image. Here, i is an index of an image included in the image reproduction list and may include numeral 1 as an initial value.

The electronic device may determine whether an image switching event occurs in step 1505. For example, the electronic device may determine whether a selection of icon "Next" is detected. As another example, the electronic device may determine whether a gesture, to which an instruction of image switching is mapped, is detected.

When the image switching event does not occur, the electronic device may maintain the display of the i-th image and play back the i-th sound source repeatedly in step 1503.

When the image switching event occurs in step 1505, the electronic device may determine whether the playback of the i-th sound source is terminated in step 1507. For example, the electronic device may determine whether a time point, at which the playback of the i-th sound source inserted into the i-th image as a watermark is to be terminated, has arrived.

When the playback of the i-th sound source is terminated, the electronic device may compare the index i of an image that is being displayed with the total number $i_{MAX}$ of images included in the image reproduction list in step 1607 so as to identify whether there is an image to be reproduced additionally in step 1509. For example, the electronic device may identify whether the index i of the image that is being displayed is equal to or larger than the total number $i_{MAX}$ of images included in the image reproduction list.

When the index i of the image that is being displayed is equal to or larger than the total number $i_{MAX}$ of images included in the image reproduction list, the electronic device may recognize that all images included in the image reproduction list have been reproduced. Therefore, the electronic device may terminate image reproduction. When the image reproduction is terminated, for example, the electronic device may apply a fade-out effect to the i-th sound source such that the playback of the sound source inserted into the image is naturally terminated. Here, the fade-out effect may refer to an effect of gradually lowering the sound volume of a sound source until the sound disappears.

When the index i of the image that is being displayed is smaller than the total number $i_{MAX}$ of images included in the image reproduction list in step 1509, the electronic device may increase an image index by one (i++) in step 1511.

The electronic device may display the i-th image on the display unit 150 and play back the i-th sound source inserted into the i-th image in step 1503.

In the above-described embodiment of the present disclosure, the electronic device may terminate the image reproduction when all images included in the image reproduction list have been sequentially reproduced.

In another embodiment of the present disclosure, the electronic device may reproduce the images starting over from the first image again when all images included in the image reproduction list have been sequentially reproduced.

Figure 16:
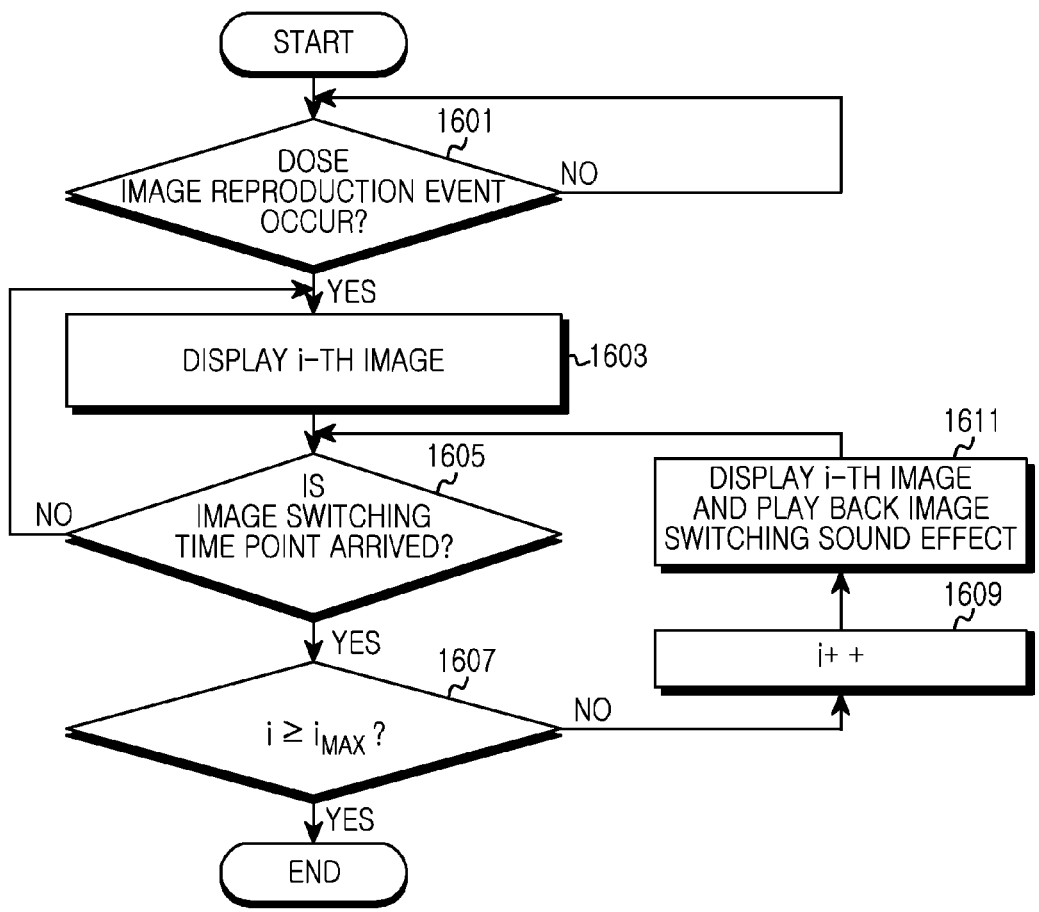
FIG. 16 illustrates a process for playing back a sound source inserted into an image in an electronic device according to another embodiment of the present disclosure.

FIG. 16 illustrates a process for playing back a sound source inserted into an image in an electronic device according to another embodiment of the present disclosure.

Referring to FIG. 16, the electronic device may determine whether an image reproduction event occurs in step 1601. For example, the electronic device may determine whether a menu for displaying a slide show is selected for a photo album based on input information provided through the input unit 140.

When the image reproduction event occurs, the electronic device may display an i-th image according to reproduction orders of images included in an image reproduction list in step 1603. Here, i is an index of an image included in the image reproduction list and may include numeral 1 as an initial value.

In step 1605, the electronic device may determine whether an image switching time point is arrived.

When the image switching time point is not arrived, the electronic device may maintain the display of the i-th image in step 1603.

When the image switching time point is arrived in step 1605, the electronic device may compare the index i of an image that is being displayed with the total number $i_{MAX}$ of images included in the image reproduction list in step 1607 so as to identify whether there is an image to be reproduced additionally in step 1607. For example, the electronic device may identify whether the index i of the image that is being displayed is equal to or larger than the total number $i_{MAX}$ of images included in the image reproduction list.

When the index i of the image that is being displayed is equal to or larger than the total number $i_{MAX}$ of images included in the image reproduction list, the electronic device may recognize that all images included in the image reproduction list have been reproduced. Therefore, the electronic device may terminate image reproduction.

When the index i of the image that is being displayed is smaller than the total number $i_{MAX}$ of images included in the image reproduction list in step 1607, the electronic device may increase an image index by one (i++) in step 1609.

When the image index is increased, the electronic device may display the i-th image on the display unit 150 based on the increased image index while playing back an image switching sound effect in step 1611.

The electronic device may determine whether an image switching time point is arrived in step 1605.

As described above, when the images included in the image reproduction list are sequentially reproduced, the electronic device may sequentially play back sound sources inserted into the respective images. Therefore, the user of the electronic device may determine whether an image is deformed based on a sound source that is being played back along with reproduction of the image.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as a storage device like a read only memory (ROM), whether erasable or rewritable or not, or in the form of memory such as a random access memory (RAM), memory chips, device, or integrated circuits, or on an optically or magnetically readable medium such as a compact disc (CD), DVD, magnetic disk, or magnetic tape, and the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing an apparatus or a method as claimed in any one of the claims of the present disclosure and a machine-readable storage storing such a program. Further, such programs may be conveyed electronically via any medium such as a communication signal carried over a wired or wireless connection and embodiments suitably encompass the same.

As described above, the electronic device divides a sound source into partial sound sources and inserts the partial sources into images as watermarks. When an image is reproduced, the electronic device may determine whether the image is modified by using information about the playback of the sound source.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure is defined not by the detailed description of the disclosure but by the appended claims and their equivalents, and all differences within the scope will be construed as being included in the present disclosure.

What is claimed is:

1. A method in an electronic device, the method comprising:
   determining, by a processor of the electronic device, one or more images to be displayed using a display;
   determining, by the processor, at least one first sound source;
   identifying, by the processor, a size of the at least one first sound source after determining the at least one first sound source;
   encoding, by the processor, the at least one first sound source such that the at least one first sound source is downsized when the size of the at least one first sound source is greater than a reference sound source size;
   dividing, by the processor, the encoded at least one first sound source into a plurality of second sound sources to be played back using a speaker; and
   inserting, by the processor, at least one of the plurality of the second sound sources as a watermark of the one or more images into the one or more images.

2. The method of claim 1, wherein dividing the encoded at least one first sound source into the plurality of the second sound sources comprises dividing the encoded at least one first sound source into the plurality of second sound sources based on a number of the determined images.

3. The method of claim 1, wherein dividing the encoded at least one first sound source into the plurality of the second sound sources comprises dividing the encoded at least one first sound source into the plurality of the second sound sources including different playback sections.

4. The method of claim 1, further comprising:
   identifying a playback time of the at least one first sound source after determining the at least one first sound source; and
   determining a start time point when the playback time of the at least one first sound source is longer than a reference playback time.

5. The method of claim 4, wherein dividing the encoded at least one first sound source into the plurality of the second sound sources comprises dividing the encoded at least one first sound source into the plurality of the second sound sources from the start time point of the at least one first sound source based on a number of the determined images.

6. The method of claim 1, wherein inserting the at least one of the plurality of the second sound sources into the one or more images comprises inserting one or more different second sound sources into the one or more images.

7. The method of claim 1, further comprising playing back, when a first image of the one or more images is displayed after inserting the at least one of the plurality of the second sound sources into the one or more images, the at least one of the plurality of the second sound sources inserted into the first image.

8. The method of claim 7, further comprising:
   displaying a second image of the one or more images at a time point which playback of the at least one of the plurality of the second sources inserted into the first image is terminated; and
   playing back the at least one of the plurality of the second sound sources inserted into the second image when the second image is displayed.

9. The method of claim 7, further comprising:
   identifying whether an image switching event occurs;
   repeatedly playing back the at least one of the plurality of the second sound sources inserted into the first image when the image switching event does not occur;
   displaying a second image of the one or more images when the image switching event occurs; and
   playing back the at least one of the plurality of the second sound sources inserted into the second image when the second image is displayed.

10. An electronic device comprising:
    a display;
    a speaker; and
    a processor configured to determine one or more images to be displayed using the display, to determine at least one first sound source, identify a size of the at least one first sound source after determining the at least one first sound source, encode the at least one first sound source such that the at least one first sound source is downsized when the size of the at least one first sound source is greater than a reference sound source size, to divide the encoded at least one first sound source into a plurality of second sound sources to be played back using the speaker, and to insert at least one of the plurality of the second sound sources as a watermark of the one or more images into the one or more images.

11. The electronic device of claim 10, wherein the processor is configured to divide the encoded at least one first sound source into the plurality of second sound sources based on a number of the one or more images.

12. The electronic device of claim 10, wherein the processor is configured to divide the encoded at least one first sound source into the plurality of the second sound sources including different playback sections.

13. The electronic device of claim 10, wherein the processor is configured to determine a start time point when a playback time of the at least one first sound source is longer than a reference playback time, and to divide the encoded at least one first sound source into the plurality of the second sound sources from the start time point of the at least one first sound source based on a number of the one or more images.

14. The electronic device of claim 10, wherein the processor is configured to insert one or more different second sound sources into the one or more images.

15. The electronic device of claim 10, wherein the processor is configured to play back, when a first image of the one or more images is displayed on the display, the at least one of the plurality of the second sound sources inserted into the first image through the speaker.

16. The electronic device of claim 15, wherein the processor is configured to display a second image of the one or more images at a time point which playback of the at least one of the plurality of the second sound sources inserted into the first image is terminated, and to play back the is configured to second sound sources inserted into the second image through the speaker when the second image is displayed on the display.

17. The electronic device of claim 15, wherein the processor is configured to repeatedly play back the at least one of the plurality of the second sound sources inserted into the first images when an image switching event does not occur, and to display a second image of the one or more images on the display when the image switching event occurs, and to play back the at least one of the plurality of the second sound sources inserted into the second image through the audio output unit when the second image is displayed on the display.

\* \* \* \* \*